Patented Jan. 24, 1933

1,895,194

UNITED STATES PATENT OFFICE

WILLY KUTZNER AND FRED KUTZNER, OF POTSDAM NEAR BERLIN, GERMANY

PROCESS OF THE PRODUCTION OF DRY GLUE

No Drawing. Application filed November 14, 1931, Serial No. 575,146, and in Germany March 28, 1931.

The invention has for its object a new process of the production of dry glue which is soluble in cold water without forming lumps.

In the manufacture of dry glues which are soluble in cold water hitherto dextrin has been dissolved in hot water in an agitating device with or without addition of chemical means, the solution then being dried by means of drying cylinders, hurdles, pans or the like with or without employment of a vacuum, or by atomization. In this way dry glues are obtained in the form of crystals, or after grinding, in a fine ground condition.

The glue produced by this process meets, true, the conditions required of a dry glue, its manufacture, however, is extraordinarily expensive because of the fact that not only the necessary apparatus are costly but also high costs are caused by the vaporization of the solution and by the water required for the preparation of the latter.

Now we have found surprisingly that a dry glue can be produced which meets in all respects the conditions required, in a direct way, that means without solution in water and subsequent re-drying. This object is attained by keeping the dextrin in permanent motion in an agitating device or similar apparatus, while a liquid such as water is supplied in fine divided state, for instance by spraying it on to the dextrin. In this way we obtain, within a comparatively short time, a fine grained product which shows all properties of a good dry glue, that means the glue is extremely fast and dissolves in cold water very quickly without lumps. By the addition of suitable chemical means to the water used, the quality of the dry glue may be further improved as to the swelling capacity, the yield, smell, taste, degree of bleaching, and viscosity. Furthermore, the time required for drying can be reduced by chemical means. These means may be added also in dry condition to the finished dry glue manufactured according to our invention, or they may be added in dry or liquid state to the starting material before the liquid is sprayed thereonto. All sorts of dextrin produced from the various kinds of starch and split up in any degree may be used.

In carrying our new process into effect, we use any suitable agitating device that means any device provided with agitating screws, arms, wings, blades or the like, and means for cooling or heating the apparatus, to which device the dry dextrin to be treated is fed in any suitable manner. Water is then supplied in fine distributed state, for instance by roses, nozzles or the like, to the dextrin which is permanently agitated until a more or less fine grained or gritty product is formed, which may be separated by sifting from the portion of dextrin not yet changed. The new product when stirred with water shows the property of dissolving very quickly without formation of lumps, while its fastness is unlimited. We attain thus by our new process a glue which in quality throughout equals the usual commercial dry glue, but we save in its manufacture the extraordinarily high expenses hitherto required.

Any desired degree of grain may be obtained by grinding and subsequent sifting the product so that our new glue can be used everywhere and especially for all purposes where hitherto dry glues, cold glues or vegetable glues have been used.

The following examples give satisfactory results:

*Example 1*

To 100 kg. dextrin are added gradually 10 kg. water in fine distributed state.

*Example 2*

To 100 kg. dextrin are added gradually 10 kg. water in fine distributed state to which 2 kg. borax or more have been added.

*Example 3*

To 100 kg. dextrin are added gradually 10 kg. water in fine distributed state in which 100 gr. sulphuric acid have been dissolved.

*Example 4*

To 100 kg. dextrin are added gradually 10 kg. water in fine distributed state in which 100 gr. sulphuric acid and 150 gr. borax have been dissolved.

Example 5

To 100 kg. dextrin are added gradually 10 kg. water in fine distributed state in which 2 kg. sodium fluoride have been dissolved.

In these prescriptions the borax effects chiefly an increase of the swelling capacity and yield and reduces the drying period, and in connection with sulphuric acid it improves the smell and taste of the glue, whilst the sulphuric acid alone improves the degree of bleaching. The sodium fluoride increases the viscosity. As to the drying period it is of certain importance to which extent the dextrins used have been split up, so that in addition to the use of chemical means the drying period can be reduced by choosing a suitable degree of split of the dextrins employed.

As tests have proved, the conversion takes place within a comparatively short time, the percentage of moisture of the product caused by the absorption of water being so, that the product is not hygroscopic, its fastness thus being unlimited.

We wish to be understood that the above-named chemical means to be added to the water or to the finished product are merely examples, and we do not limit our invention to the above prescriptions as to the nature and selection of the means to be added to the dextrin. On the contrary, we wish to state that according to our invention all chemical means can be added which are adapted to influence in any desired direction the dry glue as to its properties, appearance, smell or taste, without coming out of the scope of our invention. Furthermore, the given quantities of all ingredients are to be considered merely as examples since of course other proportions of water and dextrin etc. than the above-indicated ones may give satisfactory results, in accordance with the various kinds of dextrin that can be used. Finally, we don't wish to give any detailed prescription as to the design of the agitating device; all structures of agitating devices being well suited for carrying out the described process provided that the material to be treated is kept in permanent motion and always fresh particles thereof arrive at the surface of the material contained in the agitating vessel.

What we claim and desire to secure by Letters Patent is:

1. The method of preparing a dry glue soluble in water at normal temperatures, which comprises agitating dextrin in a fine state, and simultaneously adding water in a finely divided state thereto.

2. The method of preparing a dry glue soluble in water at normal temperatures, which comprises agitating dextrin in a fine state, and simultaneously adding water in a finely divided state thereto, the quantity of water added being just sufficient to form a gritty non-hygroscopic product.

3. A dry glue soluble in water at normal temperatures, comprising fine-grained dextrin formed by the agitation of dextrin in a finely divided state and simultaneous addition thereto of water in a finely divided state.

The foregoing specification signed this 29th day of October, 1931.

WILLY KUTZNER.
FRED KUTZNER.